United States Patent
Okumura et al.

(10) Patent No.: US 12,554,255 B2
(45) Date of Patent: Feb. 17, 2026

(54) COMPONENT SERVICE LIFE PREDICTION SYSTEM AND MAINTENANCE ASSISTANCE SYSTEM

(71) Applicant: Hitachi Construction Machinery Co., Ltd., Tokyo (JP)

(72) Inventors: Takashi Okumura, Toride (JP); Hiroyuki Konno, Tokyo (JP); Satoshi Inose, Tsukuba (JP); Shigeyuki Sakurai, Tsukuba (JP); Shinichi Oku, Ushiku (JP); Tomohiro Yoneda, Mito (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 185 days.

(21) Appl. No.: 18/023,902

(22) PCT Filed: Jan. 18, 2022

(86) PCT No.: PCT/JP2022/001621
§ 371 (c)(1),
(2) Date: Feb. 28, 2023

(87) PCT Pub. No.: WO2022/209167
PCT Pub. Date: Oct. 6, 2022

(65) Prior Publication Data
US 2023/0333549 A1 Oct. 19, 2023

(30) Foreign Application Priority Data
Mar. 31, 2021 (JP) .................................. 2021-059112

(51) Int. Cl.
*G05B 23/02* (2006.01)
*G06T 7/00* (2017.01)

(52) U.S. Cl.
CPC ........ *G05B 23/0283* (2013.01); *G06T 7/0004* (2013.01)

(58) Field of Classification Search
CPC ............ G05B 23/0283; G05B 19/4065; G05B 2219/37209; G06T 7/0004; G06Q 10/00;
(Continued)

(56) References Cited

U.S. PATENT DOCUMENTS 8,533,018 B2 * 9/2013 Miwa ..................... G06Q 10/06
705/305
9,292,011 B2 * 3/2016 Suzuki .................. G05B 15/02
(Continued)

FOREIGN PATENT DOCUMENTS

JP 2005-173979 A 6/2005
JP 2014-153929 A 8/2014
(Continued)

OTHER PUBLICATIONS

Pang-jo, C., Ji, D., Shunsuke, H., Ryosuke, Y., Toshihiro, K., Hideki, W., . . . Keiji, N. (2020). Utilization of unmanned aerial vehicle, artificial intelligence, and remote measurement technology for bridge inspections. Journal of Robotics and Mechatronics, 32(6), 1244-1258. (Year: 2020).*
(Continued)

*Primary Examiner* — Huy Q Phan
*Assistant Examiner* — Martin Walter Braunlich
(74) *Attorney, Agent, or Firm* — Crowell & Moring LLP

(57) ABSTRACT

A component life prediction system 1 includes a server device 10 configured to be able to communicate with a work machine 2, and capable of predicting the life of a component of the work machine 2. The server device 10 acquires operation information of the work machine 2 including information about the operation location of the work machine 2, and a pre-stored aerial photo of the operation
(Continued)

location of the work machine 2; estimates the industry in which the work machine 2 is used based on the acquired operation information of the work machine 2 and aerial photo of the operation location; and predicts the life of the component of the work machine 2, based on the estimated industry.

3 Claims, 11 Drawing Sheets

(58) Field of Classification Search
CPC ........ G06Q 10/04; G06Q 10/06; G06Q 10/20; G06Q 10/0631; G06Q 10/06312; G07C 5/008; G07C 5/085; G07C 3/00; E02F 9/2054; E02F 9/267; B64U 2101/00; G06F 11/008

See application file for complete search history.

(56) References Cited

U.S. PATENT DOCUMENTS

| | | | | |
|---|---|---|---|---|
| 10,540,618 | B2* | 1/2020 | Margherio | G05B 23/0267 |
| 12,091,841 | B2* | 9/2024 | Yoneda | G06Q 10/063 |
| 12,276,976 | B2* | 4/2025 | Igarashi | G05B 19/418 |
| 2005/0192860 | A1 | 9/2005 | Kouda et al. | |
| 2018/0003588 | A1 | 1/2018 | Iwanami | |
| 2018/0018641 | A1 | 1/2018 | Jussel et al. | |
| 2018/0051442 | A1 | 2/2018 | Igarashi et al. | |
| 2022/0165058 | A1* | 5/2022 | Toda | G06V 20/17 |
| 2022/0341132 | A1* | 10/2022 | Carpenter | E02F 9/267 |
| 2022/0414559 | A1* | 12/2022 | Mitani | G07C 5/008 |

FOREIGN PATENT DOCUMENTS

| | | |
|---|---|---|
| JP | 2017-8524 A | 1/2017 |
| JP | 2017-174308 A | 9/2017 |
| JP | 2018-14092 A | 1/2018 |
| JP | 2020-98455 A | 6/2020 |
| JP | 2020-173556 A | 10/2020 |
| WO | WO 2014/132903 A1 | 9/2014 |

OTHER PUBLICATIONS

International Search Report (PCT/ISA/210) issued in PCT Application No. PCT/JP2022/001621 dated Mar. 15, 2022 with English translation (five (5) pages).

Japanese-language Written Opinion (PCT/ISA/237) issued in PCT Application No. PCT/JP2022/001621 dated Mar. 15, 2022 (four (4) pages).

Japanese-language Office Action issued in Japanese Application No. 2023-510509 dated Feb. 6, 2024 (7 pages).

Extended European Search Report issued in European Application No. 22779399.9 dated Nov. 8, 2024 (9 pages).

* cited by examiner

Fig. 3

| Machine number | Date of operation | Operation time | Travelling time | Excavation time | Swing time | Fuel consumption (ℓ/h) | Latitude | Longitude |
|---|---|---|---|---|---|---|---|---|
| 01 | 2019/1/1 | 1000 | 100 | 650 | 500 | 20 | 45.1228 | 142.3575 |
| 01 | 2019/1/2 | 1007 | 101 | 655 | 504 | 21 | 45.1228 | 142.3569 |
| 01 | 2019/1/3 | 1014 | 102 | 659 | 507 | 20 | 41.8234 | 140.6338 |
| ... | ... | ... | ... | ... | ... | ... | ... | ... |

Fig. 4

| Machine number | Date of replacement | Replacement component number | Number of items |
|---|---|---|---|
| 01 | 2018/1/1 | a1 | 5 |
| 01 | 2018/7/1 | a1 | 5 |
| ... | ... | ... | ... |

Fig. 5

| Machine number | Client name |
|---|---|
| 01 | Company a |
| 02 | Company b |
| ... | ... |

Fig. 6

| | Scrapping | Raw material extraction | Industrial waste disposal | Civil engineering |
|---|---|---|---|---|
| Mounting/operating of attachment | ◎ Work such as excavating with bucket virtually nonexistent | △ For middle-sized excavator, mostly loading operation | △ Work mode varies between in-plant work, landfill, etc. | △ |
| Excavation load | ◎ | ◎ | ○ | ◎ |
| Amount of swing operation | ○ | ○ Frequent swing with large angles | ○ | ◎ Frequent swing with large angles |
| No-operation time | △ | △ Wait time is incurred for loading operation, etc. | △ | △ Wait time is incurred for loading operation, etc. |
| Travelling frequency | △ | ○ | △ | ○ |

COMPONENT SERVICE LIFE PREDICTION SYSTEM AND MAINTENANCE ASSISTANCE SYSTEM

TECHNICAL FIELD

The present invention relates to a component life prediction system and a maintenance assistance system, and particularly to a component life prediction system and a maintenance assistance system for predicting the life of a component of a work machine.

The present application claims priority from Japanese patent application JP 2021-059112 filed Mar. 31, 2021, the entire content of which is hereby incorporated by reference into this application.

BACKGROUND ART

Conventionally, in the relevant technical field, a supplemental component production prediction system is known in which, as described in Patent Literature 1, for example, a load applied to a component in an operating area is acquired from a server based on position information of a work machine, the life of the component is predicted for each operation area based on the operating history of the work machine, and warning information is transmitted to the work machine in which the component life has been reached.

CITATION LIST

Patent Literature

Patent Literature 1: JP 2005-173979 A

SUMMARY OF INVENTION

Technical Problem

However, in the case of the supplemental component production prediction system described in Patent Literature 1, it cannot be said that highly accurate life prediction is possible simply by associating the load of the component with each operation area. Further, data concerning the load applied to the component in the operation area needs to be prepared in advance for each operation area. This creates the problem that, while the life of the component may be predicted for an area in which an operation has been performed in the past, the life cannot be predicted for a new operation area, since the data concerning the load applied to the component in that area is not available. As a result, the accuracy of prediction of the life of the component is decreased.

In view of the above, it is an object of the present invention to provide a component life prediction system and a maintenance assistance system that offers increased prediction accuracy with which the life of a component of a work machine is predicted.

Solution to Problem

A component life prediction system according to the present invention includes a server device configured to be able to communicate with a work machine, and capable of predicting the life of a component of the work machine. The server device acquires operation information of the work machine including operation location information of the work machine, estimates an industry in which the work machine is used based on the operation information of the work machine and a pre-stored aerial photo of the operation location of the work machine, and predicts the life of the component of the work machine, based on the estimated industry.

In the component life prediction system of the present invention, the industry in which the work machine is used is estimated based on the operation information of the work machine and the pre-stored aerial photo of the operation location of the work machine, and the life of the component of the work machine is predicted based on the estimated industry. In this way, it is possible to take into consideration the operation environment and operational feature of the work machine in each industry, and to then perform the component life prediction tailored to the industry. Accordingly, increased prediction accuracy can be obtained.

Advantageous Effects of Invention

According to the present invention, the accuracy of prediction of the life of a component of a work machine can be increased.

BRIEF DESCRIPTION OF DRAWINGS

FIG. 3 illustrates an example of a daily operation report table.

FIG. 4 illustrates an example of a component replacement history table.

FIG. 5 illustrates an example of a client information table.

FIG. 6 illustrates examples of operational features of a work machine in various industries.

DESCRIPTION OF EMBODIMENTS

In the following, reference is made to the drawings to describe embodiments of the component life prediction system and the maintenance assistance system according to the present invention. Before describing the embodiments, the context leading to the present invention will be discussed.

A work machine, such as a hydraulic excavator, is used in various industries. Depending on the industry, the operation environment of the hydraulic excavator varies greatly, and so the extent of wear of components of the hydraulic excavator and the cause of failure also vary. For example, even for the same type of hydraulic excavator, a hydraulic excavator used for wrecking is subjected to greater damage to the claw teeth of an attachment thereof than for other industries, such as scrapping and industrial waste disposal, and the claw teeth of the attachment wear faster.

Further, consider the same type of hydraulic excavator used in the respective industries of crushing stones, industrial waste disposal, civil engineering, renting, scrapping, and wrecking. With regard to the sprocket teeth as an example, the tendencies are that the amount of wear of the sprocket teeth is the smallest for the renting industry, and the amount of wear of the sprocket teeth is the greatest for the scrapping industry. This is presumably because of the presence of more metal pieces in a scrap yard compared to other industries. As the metal pieces are caught between the sprocket teeth and the links of the hydraulic excavator, the work machine travels while crunching the metal pieces being caught, thus accelerating the wear of the sprocket teeth.

Meanwhile, with regard to the shoe lug as an example, the tendencies are that the amount of wear of the shoe lug is the smallest for the renting industry, and the amount of wear of the shoe lug is the greatest for the stone-crushing industry. This is presumably because of the presence of a large number of crushed stones that are hard and pointed in a quarry, causing greater damage to the shoe lug.

Accordingly, the present inventors focused on the variations in the extent of wear and the cause of failure of work machine components between different industries, and discovered that the accuracy of prediction of the life of a component can be increased by estimating the industry in which the work machine is used, and then considering the operation environment and an operational feature of the work machine in the estimated industry, thereby arriving at the present invention.

[Component Life Prediction System]

Figure 1:
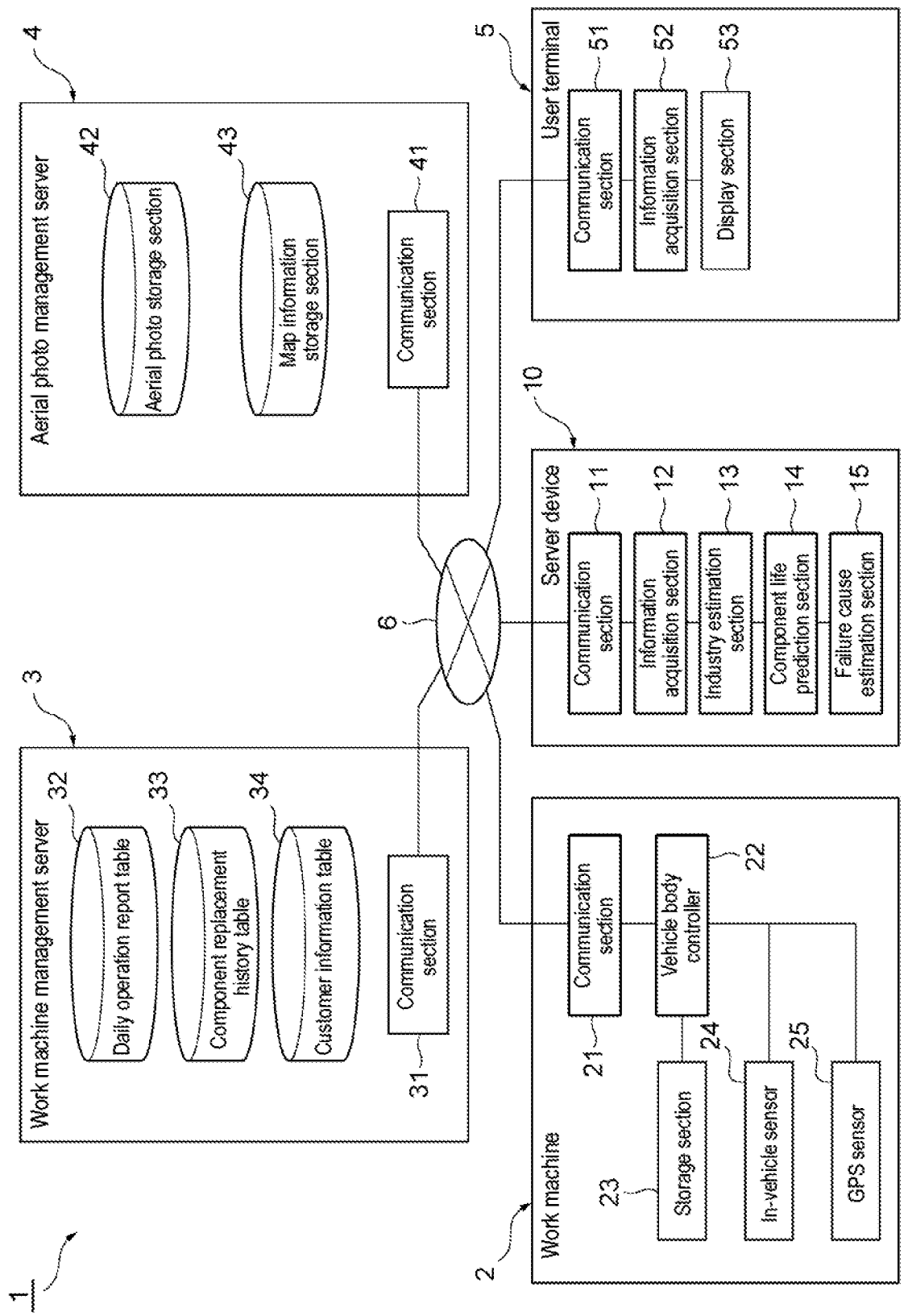
FIG. 1 is a schematic configuration diagram of a component life prediction system according to an embodiment.

FIG. 1 is a schematic configuration diagram of a component life prediction system according to an embodiment. As illustrated in FIG. 1, the component life prediction system 1 comprises a work machine 2, a work machine management server 3, an aerial photo management server 4, a server device 10 for predicting the life of a component of the work machine 2, and a user terminal 5. The work machine 2, the work machine management server 3, the aerial photo management server 4, the server device 10, and the user terminal 5 are configured to be able to communicate with each other via a network 6.

In the present embodiment, a hydraulic excavator will be described as an example of the work machine 2. However, the work machine 2 is not limited to a hydraulic excavator and may be a wheel loader, a bulldozer, and the like. The work machine 2 is not limited to a single work machine and may include a plurality of work machines. Each work machine 2 is given an identification number.

As illustrated in FIG. 1, the work machine 2 includes a communication section 21, a vehicle body controller 22, a storage section 23, and an in-vehicle sensor 24. The communication section 21 is a wireless device, for example, for connection with the network 6. The communication section 21, for example, transmits various data detected by the in-vehicle sensor 24 to the work machine management server 3; transmits operation information of the work machine 2 to the work machine management server 3 periodically (such as at the frequency of once every day); and transmits component replacement information of the work machine 2 to the work machine management server 3. The communication section 21 receives an update program for the vehicle body controller 22 transmitted from the work machine management server 3. When the various data detected by the in-vehicle sensor 24, the operation information, and the component replacement information are transmitted to the work machine management server 3, the communication section 21 transmits the identification number of the work machine 2 at the same time.

The vehicle body controller 22 is composed of a microcomputer consisting of a combination of, e.g., a central processing unit (CPU) for performing computations, a read-only memory (ROM) as a secondary storage device in which a program for computations is recorded, and a random access memory (RAM) as a temporary storage device for saving the course of computations and temporary control variables. The vehicle body controller 22 executes the stored program to control the work machine 2 as a whole.

The storage section 23 stores a program for controlling the work machine 2, data detected by the in-vehicle sensor 24, and the like. The in-vehicle sensor 24, which includes various sensors attached to the work machine 2, detects various data regarding the operation of the work machine 2, and outputs the detected data to the vehicle body controller 22. The in-vehicle sensor 24 may include, for example, inertial measurement units (IMU) for respectively detecting the inclinations of the arm, boom, and bucket of the work machine 2; a swing angle sensor for detecting the swing angle of a swing body of the work machine 2; and a travelling operation sensor for detecting a travelling operation.

The work machine 2 is also equipped with a global positioning system (GPS) sensor 25. The GPS sensor 25 has an antenna for receiving a signal from a GPS satellite, and detects information about the operation location of the work machine 2 in a terrestrial coordinate system, based on a time difference of signals received from a plurality of GPS satellites.

The work machine management server 3 is installed at the head office, a branch office, a factory, or a management center of the manufacturer of the work machine 2, and periodically collects the operation information and component replacement information and the like transmitted from the work machine 2 to perform central management of the work machine 2. The work machine management server 3 is composed of, e.g., a microcomputer consisting of a combination of a central processing unit (CPU) for performing computations; a read-only memory (ROM) as a secondary storage device in which a program for computations is stored; and a random access memory (RAM) as a temporary storage device for saving the course of computations and temporary control variables. The work machine management server 3 executes various processes by performing the stored program.

The work machine management server 3 includes a communication section 31, a daily operation report table 32, a component replacement history table 33, and a client information table 34. The communication section 31 is, e.g., a wireless device for connection with the network 6. The communication section 31, for example, receives the operation information, component replacement information, and the like transmitted from the work machine 2, and transmits the operation information of the work machine 2 to the server device 10 in accordance with a request from the server device 10.

The daily operation report table 32 is created based on the operation information transmitted from the work machine 2. The daily operation report table 32 stores, as illustrated in FIG. 3 for example, items such as "Machine number", "Date of operation", "Operation time", "Travelling time", "Excavation time", "Swing time", "Fuel consumption", "Latitude", and "Longitude". The machine number is the identification number of the work machine 2. The date of operation is the date of reception of the operation information transmitted from the work machine 2. The operation time, travelling time, excavation time, swing time, and fuel consumption are calculated based on data detected by the in-vehicle sensor 24 of the work machine 2. The latitude and longitude are detected by the GPS sensor 25 of the work machine 2. Instead of the "Date of operation", "Date/time of operation" may be used.

The component replacement history table 33 is created based on the component replacement information transmitted from the work machine 2. The component replacement history table 33 describes items such as, as illustrated in FIG. 4 for example, "Machine number", "Date of replacement", "Replacement component number", and "Number of items". The client information table 34 is used to manage information about clients, i.e., the users of the work machine 2. The client information table 34 describes, as illustrated in FIG. 5 for example, "Machine number" and "Client name".

The aerial photo management server 4 collects and manages aerial photos taken at various areas of the world, and provides them externally via the network 6. Preferably, the aerial photos, which may be referred to as photos taken from the sky, are periodically updated. The aerial photo management server 4 includes a communication section 41, an aerial photo storage section 42 for storing aerial photos, and a map information storage section 43 for storing map information. The aerial photo management server 4 may not include the map information storage section 43.

Further, the aerial photo management server 4 extracts an aerial photo corresponding to certain latitude and longitude (for example, the operation location of the work machine 2) from the aerial photo storage section 42 in accordance with a request from the work machine management server 3 or the server device 10, and transmits the extracted photo to the work machine management server 3 or the server device 10.

The user terminal 5 is, e.g., a smartphone, a tablet terminal, a cell phone, a personal computer (PC) or the like, and is carried by a maintenance worker, an owner or the like of the work machine 2. The user terminal 5 includes a communication section 51, an information acquisition section 52 for acquiring information transmitted from the server device 10, and a display section 53 comprising a display for displaying the acquired information.

The server device 10 is composed of, e.g., a microcomputer consisting of a combination of a central processing unit (CPU); a read-only memory (ROM) as a secondary storage device in which a program for computations is stored; and a random access memory (RAM) as a temporary storage device for saving the course of computations and temporary control variables. The server device 10 executes the stored program to perform processes of calculation, prediction, estimation, and the like.

In the present embodiment, the server device 10 estimates the industry in which the work machine 2 is used, based on the operation information of the work machine 2 transmitted from the work machine management server 3, and the aerial photo transmitted from the aerial photo management server 4; predicts the life of a component of the work machine 2, based on the estimated industry; and further estimates the cause of failure of the component. Accordingly, the server device 10 of the present embodiment includes a communication section 11, an information acquisition section 12, an industry estimation section 13, a component life prediction section 14, and a failure cause estimation section 15.

The communication section 11 is, e.g., a wireless device for connection with the network 6. For example, the communication section 11 receives the operation information of the work machine 2 transmitted from the work machine management server 3 and the aerial photo transmitted from the aerial photo management server 4, and transmits various information obtained from the server device 10 to the user terminal 5. The information acquisition section 12 acquires, via the communication section 11, the operation information of the work machine 2 from the work machine management server 3 and the aerial photo from the aerial photo management server 4, and stores the acquired information.

The industry estimation section 13 estimates the industry in which the work machine 2 is used, based on the operation information of the work machine 2 acquired by the information acquisition section 12 and the aerial photo of the operation location of the work machine 2. Specifically, the industry estimation section 13 first identifies the industry in which the work machine 2 has been used in the past, and associates the identified industry with the aerial photo of the operation location of the past use, to thereby create teacher data for machine learning. The industry estimation section 13 further performs machine learning by deep learning with respect to the created teacher data, to build an industry estimation model. Then, the industry estimation section 13, using the industry estimation model that has been built, estimates the industry in which the work machine 2 is used, based on the operation information of the work machine 2 and the aerial photo of the operation location of the work machine 2.

More specifically, when building the industry estimation model, the industry estimation section 13 first extracts operation location information (namely, latitude and longitude) included in the past operation information of the work machine 2 acquired by the information acquisition section 12. Then, the industry estimation section 13 acquires the aerial photo corresponding to the extracted longitude and latitude (namely, the aerial photo of the operation location), from the aerial photo management server 4 via the information acquisition section 12 and the communication section 11.

Then, the industry estimation section 13, using the acquired aerial photo of the operation location of the work machine 2 and the identified industry in which the work machine 2 has been used, creates teacher data for machine learning (namely, a group of aerial photo files with the names of industries). The industry estimation section 13 then performs deep learning with respect to the created teacher data to automatically extract respective features, thereby performing industry classification and building the industry estimation model. The industries herein include, for example, scrapping; raw material extraction, such as quarrying and collection of river sand; industrial waste disposal; civil engineering; wrecking; road construction; steels/metals; forestry; harbor loading/unloading; recycling; agriculture; and renting.

Further, the industry estimation section 13 of the present embodiment estimates, by decision tree classification, for example, the industry in which the work machine 2 is used, based on the acquired operation information of the work machine 2 and an operational feature of the work machine 2 in each industry created in advance. Herein, the work machine has a tendency of operation (hereafter referred to as "operational feature") that is performed frequently depending on the industry (site of operation). The operational feature, in other words, is the characteristic way in which the work machine 2 is used in each industry.

Specifically, the industry estimation section 13 performs industry classification according to decision tree classification, based on the operational feature of the work machine 2, as illustrated in FIG. 6 for example, in which the horizontal axis shows the industry (scrapping, raw material extraction, industrial waste disposal, civil engineering), and the vertical axis shows the operational feature (mounting/operating of an attachment; excavation load; amount of swing operation; no-operation time; and travelling frequency). In FIG. 6, the double-circles indicate that the abundance of the key is high; the single circles indicate that the abundance of the key is moderate; and the triangles indicate that the abundance of the key is low. The "key" refers to an operation of the work machine characteristic to the industry.

For example, with respect to the example of mounting/operating of an attachment in FIG. 6, among scrapping, raw material extraction, industrial waste disposal, and civil engineering, scrapping has the feature that the mounting/operating of an attachment occurs more often compared to raw material extraction, industrial waste disposal, and civil engineering. Likewise, with respect to the example of excavation load, among scrapping, raw material extraction, industrial waste disposal, and civil engineering, industrial waste disposal has the feature that the excavation load is smaller compared to scrapping, raw material extraction, and civil engineering. The information concerning the mounting/operating of an attachment, excavation load, amount of swing operation, no-operation time, and travelling frequency is obtained from the daily operation report of the work machine 2.

As the operational feature of the work machine 2 in each industry, in the case of scrapping, sorting and unloading of metals and the like by means of a lif-mag ("lifting magnet") or a fork often occurs. In the case of raw material extraction, surface-earth removal, excavation/loading, plant loading by means of a bucket, and secondary-crushing by a breaker often occur. Further, in the case of industrial waste disposal, unloading by means of a bucket or a fork, leveling work, moving of industrial waste, surface-earth covering, and compacting work often occur. In the case of civil engineering, excavation/loading of earth/sand, moving of earth/sand, ground leveling, and laying/leveling by means of a bucket often occur, and swing operations tend to occur more often compared to the others.

The operational feature of the work machine 2 in each industry may also concern a difference in the moving distance of the work machine 2. For example, in the industrial waste disposal, scrapping, recycling, agriculture, steel/iron-making, and wrecking industries, the operating range of the work machine is limited to within a certain area, so that the moving distance of the work machine is within about 100 m and the travelling frequency is low. In the harbor loading/unloading, raw material extraction, civil engineering, and road construction industries, the moving distance of the work machine is within about 500 m, for example. Meanwhile, in the stone-crushing industry, the moving distance of the work machine is greater and within about 1 km, for example. In the forestry industry, the moving distance of the work machine is even greater and within about 3 km, for example, and the travelling frequency is higher.

Accordingly, the industry estimation section 13 can utilize the difference in moving distance in each industry (in other words, the characteristic of moving distance in each industry) to perform industry classification. The moving distance of the work machine 2 can be obtained from the daily operation report of the work machine 2.

Further, in the present embodiment, the industry estimation section 13 uses the result of industry estimation based on the operation information of the work machine 2 and the operational feature of the work machine 2 in each industry, to increase the accuracy of the industry estimation model built by the machine learning performed with respect to the aerial photo. That is, the industry estimation section 13, by combining the result of industry estimation based on the operation information of the work machine 2 and the operational feature of the work machine 2 in each industry, with the result of industry estimation obtained by performing machine learning with respect to the aerial photo, can build a highly accurate industry estimation model. In this way, the accuracy of industry classification can be further improved.

When it is desired to estimate the industry in which a certain work machine 2 is used, the industry estimation section 13 acquires the aerial photo of the operation location of the work machine 2 from the aerial photo management server 4, based on information about the operation location of the work machine 2, and estimates the industry in which the work machine 2 is used, based on the acquired aerial photo and the industry estimation model built as described above.

In this case, the industry estimation section 13 preferably performs further industry estimation, based on the operation information of the work machine 2 for which the industry is desired to be estimated and the operational feature of the work machine 2 in each industry, and combines the result of this estimation with the result of industry estimation based on the aerial photo and the industry estimation model, to increase the accuracy of industry estimation. Further preferably, the estimation result of the industry estimation section 13 is fed back to the teacher data for machine learning.

The component life prediction section 14 predicts the life of a component of the work machine 2, based on the industry estimated by the industry estimation section 13. Specifically, the component life prediction section 14 uses pre-created graphs, tables and the like of the relationship between the operation time and wear rate of a model component for each industry, and predicts the life of the model component of the industry, based on the operation time of the work machine 2 (total operation time). In the present embodiment, the life of a component means a remaining use time of the component assuming the operation will continue under the current use conditions. The model component for each industry may be a single component or include a plurality of components.

The component life prediction section 14 also refers to a component replacement history stored in the component replacement history table 33 of the work machine management server 3 to predict the life of the model component. For example, when a certain model component is replaced, the total operation time regarding the component is reset and re-computed.

The failure cause estimation section 15 estimates a failure cause, based on the industry estimated by the industry estimation section 13, taking the failure tendency of the work machine 2 in the industry into consideration. The failure tendency of the work machine 2 for each industry is extracted by statistically processing the past failure causes in each industry.

For example, if the industry is scrapping, metal pieces in the scrap yard often become pinched between the undercarriage components of the hydraulic excavator, and travelling component failures due to such pinching of metal pieces tend to occur often. Thus, if it is estimated that the industry in which the work machine 2 has been used is scrapping and abnormality is detected in a travelling component, the failure cause estimation section 15 makes an estimation focusing on whether the failure is caused by the pinching of metal pieces, taking the above failure tendency into consideration.

Further, if the industry is civil engineering, dirt and sand are likely to enter components such as an air cleaner, tending to cause abnormal combustion of the engine. Thus, if it is estimated that the industry in which the work machine 2 has been used is civil engineering and abnormal combustion of the engine occurs, the failure cause estimation section 15 makes an estimation focusing on whether the cause is entry of dirt or sand into the air cleaner.

Then, the server device 10 transmits the result estimated by the industry estimation section 13, the result predicted by the component life prediction section 14, and the result estimated by the failure cause estimation section 15 to the user terminal 5.

Figure 2:
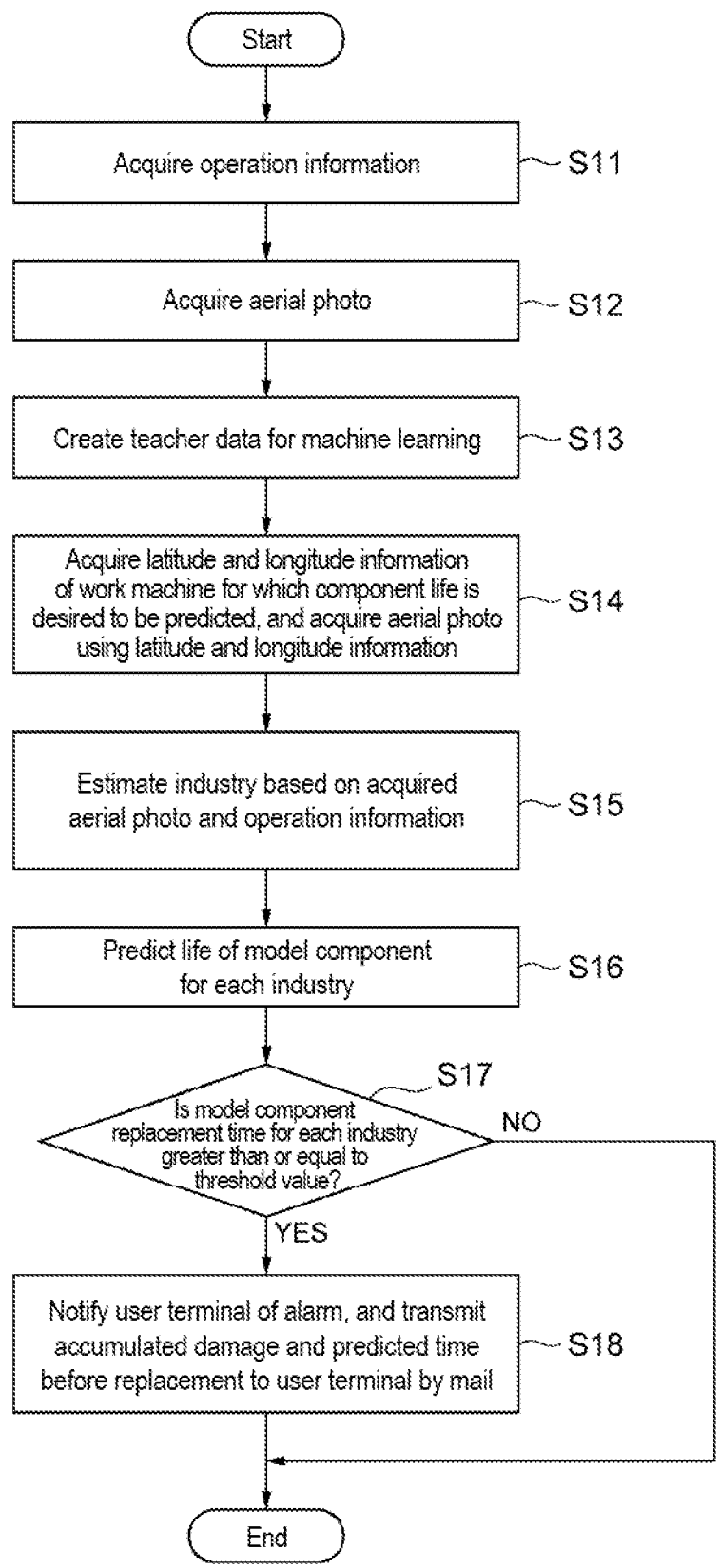
FIG. 2 is a flowchart of a control process of a server device.

In the following, reference is made to FIG. 2 to describe a control process of the server device 10.

First, in step S11, the information acquisition section 12 of the server device 10 acquires the operation information of the work machine 2 from the work machine management server 3 via the communication section 11. In step S12 following step S11, the information acquisition section 12 extracts information about the operation location (latitude and longitude) of the work machine 2 from the acquired operation information of the work machine 2, acquires the aerial photo of the operation location from the aerial photo management server 4 via the communication section 11, and stores them. The operation information acquisition (step S11) and aerial photo acquisition (step S12) herein are automatically performed by the information acquisition section 12 at a constant period, for example.

In step S13 following step S12, the industry estimation section 13 creates teacher data for machine learning, based on the acquired operation information and aerial photo, and builds the industry estimation model, as described above.

In step S14 following step S13, the server device 10 acquires the information about the operation location (latitude and longitude) of the work machine 2 of which the life of a component is desired to be predicted, and acquires an aerial photo from the aerial photo management server 4 in accordance with the latitude/longitude information. With respect to the work machine 2 of which the life of a component is desired to be predicted, the server device 10 may make a decision in accordance with an instruction from the work machine management server 3, or may make a decision on its own accord.

In step S15 following step S14, the industry estimation section 13 estimates the industry in which the work machine 2 of which the life of a component is desired to be predicted has been used, based on the acquired aerial photo and operation information of the work machine 2, as described above. That is, industry estimation is performed using both the industry estimation based on the aerial photo and the industry estimation model, and the industry estimation based on the operation information of the work machine 2 and the operational feature of the work machine 2 in each industry.

In step S16 following step S15, the component life prediction section 14 predicts the life of a model component for each industry, based on the result of industry estimation in step S15. The model component refers to a component serving as a benchmark (index) for life prediction. Specifically, the server device 10 initially extracts a model component for a particular industry, based on the result of industry estimation in step S15. For example, if it is estimated in step S15 that the industry in which the work machine 2 has been used is scrapping, the server device 10 extracts a sprocket as the model component for the scrapping industry.

Then, the component life prediction section 14 predicts the life of the sprocket, based on the operation time (total operation time) of the work machine 2 on the basis of a pre-created graph of the relationship between the operation time and wear rate of the sprocket. Further, the component life prediction section 14 calculates a replacement time for the sprocket, based on the predicted life of the sprocket.

In step S17 following step S16, the server device 10 determines whether the replacement time of the model component for each industry is greater than or equal to a threshold value. For example, the server device 10 compares the replacement time for the sprocket calculated by the component life prediction section 14 with a preset threshold value, and determines whether the replacement time for the sprocket is greater than or equal to the threshold value. The threshold value herein is a guide for issuing an alarm calling for attention, and is set to 90% of the replacement time, for example. The threshold value may be changed as appropriate depending on the situation.

If it is determined that the model component replacement time for each industry is not greater than or equal to the threshold value, the control process ends. On the other hand, if it is determined that the model component replacement time for each industry is greater than or equal to the threshold value, the control process proceeds to step S18. In step S18, the server device 10 notifies the user terminal 5 of the alarm via the communication section 11, and also transmits a mail with an address for confirming an accumulated damage of the component and a predicted value before replacement to the user terminal 5.

The accumulated damage of the component is calculated with reference to the proportions of the industries in which the work machine 2 has been used in the past. As an example, if the proportions of the industries in which the work machine 2 has been used in the past is 70% scrapping and 30% industrial waste disposal, the calculation is performed according to "accumulated damage (%)=coefficient for scrapping industry×70%+coefficient for industrial waste disposal industry×30%". The coefficient for scrapping industry is set to 1, and the coefficient for industrial waste disposal industry is set to 0.5, for example. Further, if the proportions of the industries in which the work machine 2 has been used in the past is 50% raw material extraction and 50% civil engineering, the calculation is performed according to "accumulated damage (%)=coefficient for raw material extraction industry×50%+coefficient for civil engineering industry×50%". The predicted value before replacement is a value indicating how much time there is before the component reaches the threshold value for its life. In this case, a graph indicating the correlation between the level of damage to the component and the replacement time may also be transmitted to the user terminal 5 at the same time.

Figure 7:
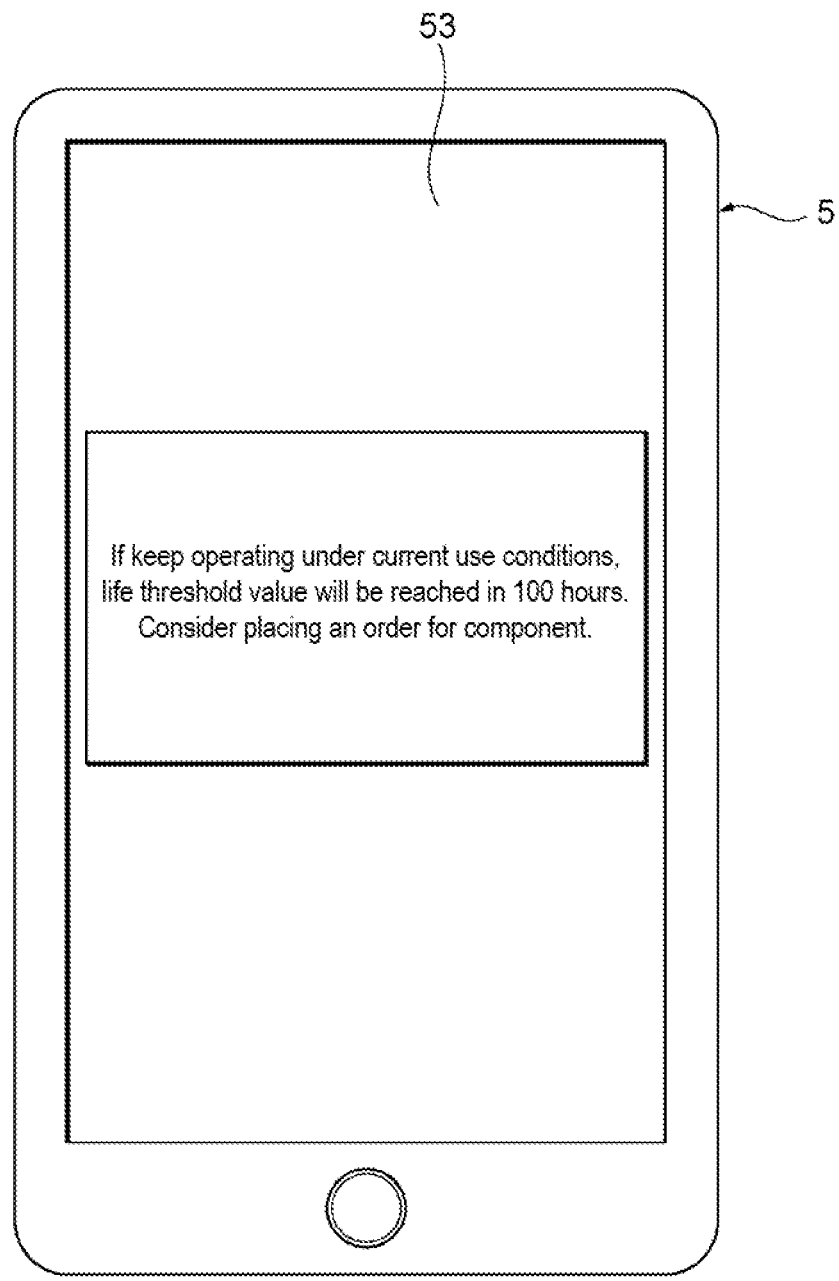
FIG. 7 illustrates an example of a message displayed on a user terminal.

Then, when the address attached to the received mail is clicked on the user terminal 5, as illustrated in FIG. 7, a message such as "If keep operating under current use conditions, life threshold value will be reached in 100 hours. Consider placing an order for component." is displayed on the display section 53. The message is not limited to a text message, and may be instead in the form of simplified classifications, such as, in order of decreasing life threshold value: "A (replacement recommendation level: high)", "B (replacement recommendation level: intermediate)", and "C (replacement recommendation level: low)". The owner or the like of the work machine 2, seeing the displayed message, can know the life of a component easily, and will therefore be able to make a component purchase plan more easily. Further, the message is not limited to a text display, and may show, e.g., a diagrammatic figure of the work machine, with a relevant portion blinking. The blinking may be configured such that different colors such as red, yellow, and blue are displayed in order of decreasing life threshold value (the closest replacement time shown first), wherein a blinking portion may be tapped to show further information (summary) about the failure. The failure portion may be enlarged or shrunk as desired by a pinch-in or pinch-out operation performed on the operating screen of the user terminal. In this way, the accumulated damage at and the life of a portion of the work machine 2 can be intuitively and visually confirmed. It also becomes possible to know a summary of responses including the replacement time.

The model component for each industry may be a single component or include a plurality of components. In the case of a plurality of model components, the life prediction is made and the replacement time is calculated for each model component in step S16, and a comparison of the replacement time and the threshold value for each model component is performed in step S17. If it is determined that the replacement time for one of the plurality of model components is greater than or equal to the threshold value, alarm notification and mail transmission to the user terminal 5 are performed.

The server device 10 configured as described above includes: the information acquisition section 12 that acquires the operation information of the work machine 2 including the information about the operation location of the work machine 2, and the aerial photo of the operation location of the work machine 2; the industry estimation section 13 that estimates the industry in which the work machine 2 is used by machine learning, based on the acquired operation information of the work machine 2 and aerial photo of the operation location; and the component life prediction section 14 that predicts the life of a component of the work machine 2, based on the estimated industry. In this way, it is possible to take into consideration the operation environment and operational feature of the work machine 2 in each industry, and to then perform component life prediction tailored to the industry. Thus, increased prediction accuracy can be obtained.

As a result, it becomes possible to make suggestions to the user, a business agency or the like of the work machine 2 for component replacement in a timely manner. Thus, a loss of operation time due to component failure can be prevented. Further, by building the industry estimation model by machine learning using the operation information of the work machine 2 and the aerial photo of the operation location of the work machine 2, the accuracy of the industry estimation model that is built can be increased, and the industry can be estimated even for a new construction site.

Figure 8:
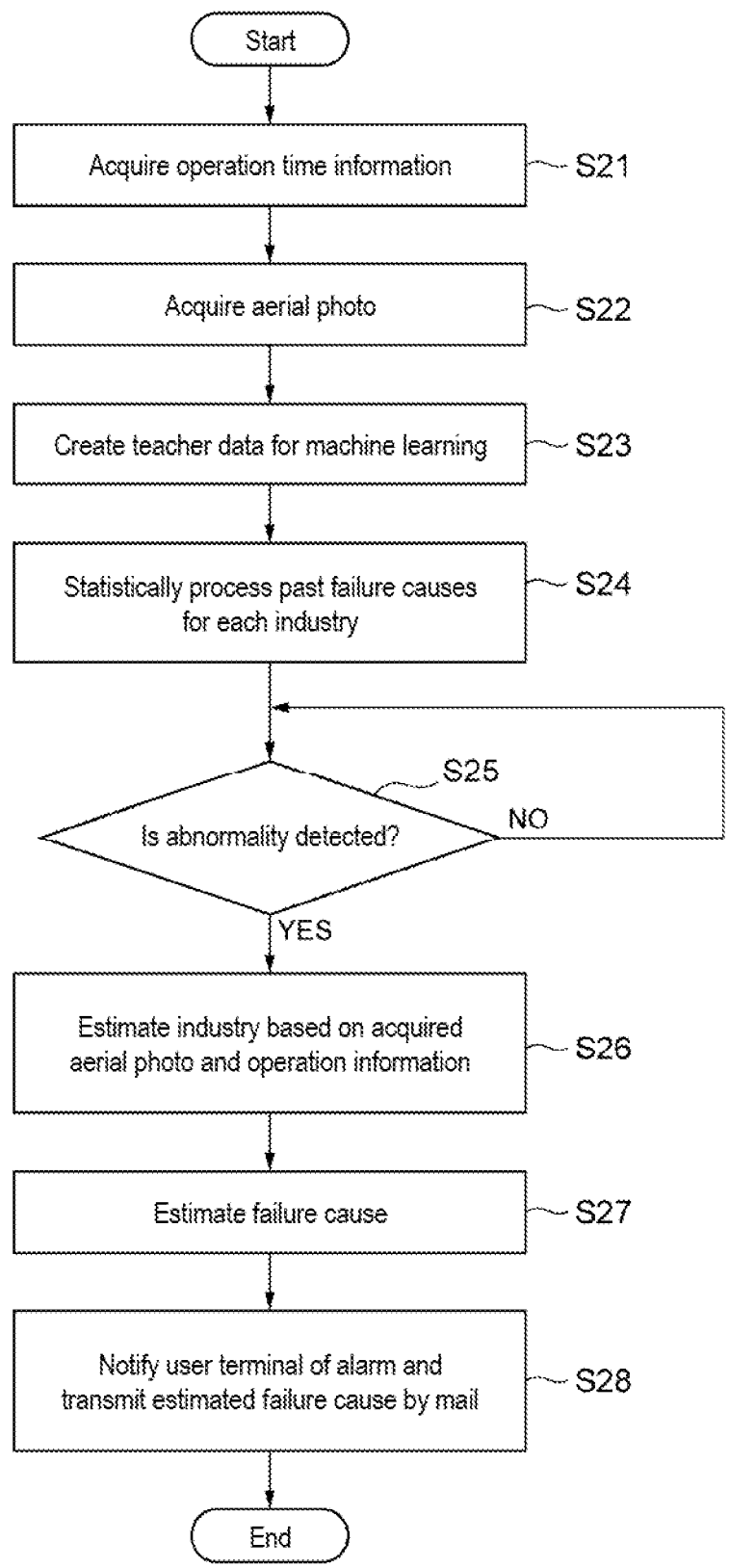
FIG. 8 is a flowchart of another control process of the server device.

The control process of the server device 10 of the present embodiment is not limited to the foregoing, and a control process illustrated in FIG. 8 may be performed, for example.

Step S21 to S23 of FIG. 8 are the same as step S11 to S13 described above, and, therefore, duplicate descriptions are omitted. In step S24 following step S23, the failure cause estimation section 15, as described above, statistically processes the past failure causes for each industry and extracts the failure tendency of the work machine 2 for each industry.

In step S25 following step S24, the server device 10 determines whether abnormality is detected. Specifically, the server device 10 determines whether abnormality is detected based on the result of detection made by the in-vehicle sensor 24 of the work machine 2 and transmitted via the communication section 21. Step S25 is repeated until abnormality is detected.

If it is determined that there is detection of abnormality (YES), the control process proceeds to step S26. In step S26, the industry estimation section 13 estimates the industry of the work machine 2 in which the abnormality has been detected, based on the acquired aerial photo and operation information of the work machine 2, as described above. Specifically, the information acquisition section 12 of the server device 10 acquires information about the operation location (latitude and longitude) of the work machine 2 in which the abnormality has been detected, and acquires the aerial photo of the operation location from the aerial photo management server 4. Then, the industry estimation section 13 performs the same process as step S15 described above, and performs industry estimation for the work machine 2 in which the abnormality has been detected.

In step S27 following step S26, the failure cause estimation section 15, using the failure tendency of the work machine 2 extracted for each industry in step S24, estimates the failure cause regarding the abnormality detected in step S25.

In step S28 following step S27, the server device 10 notifies the user terminal 5, via the communication section 11, of an alarm indicating that a component may have failed. Also, the server device 10 transmits a mail with an address enabling confirmation of, e.g., an estimated cause of the failure to the user terminal 5.

Figure 9:
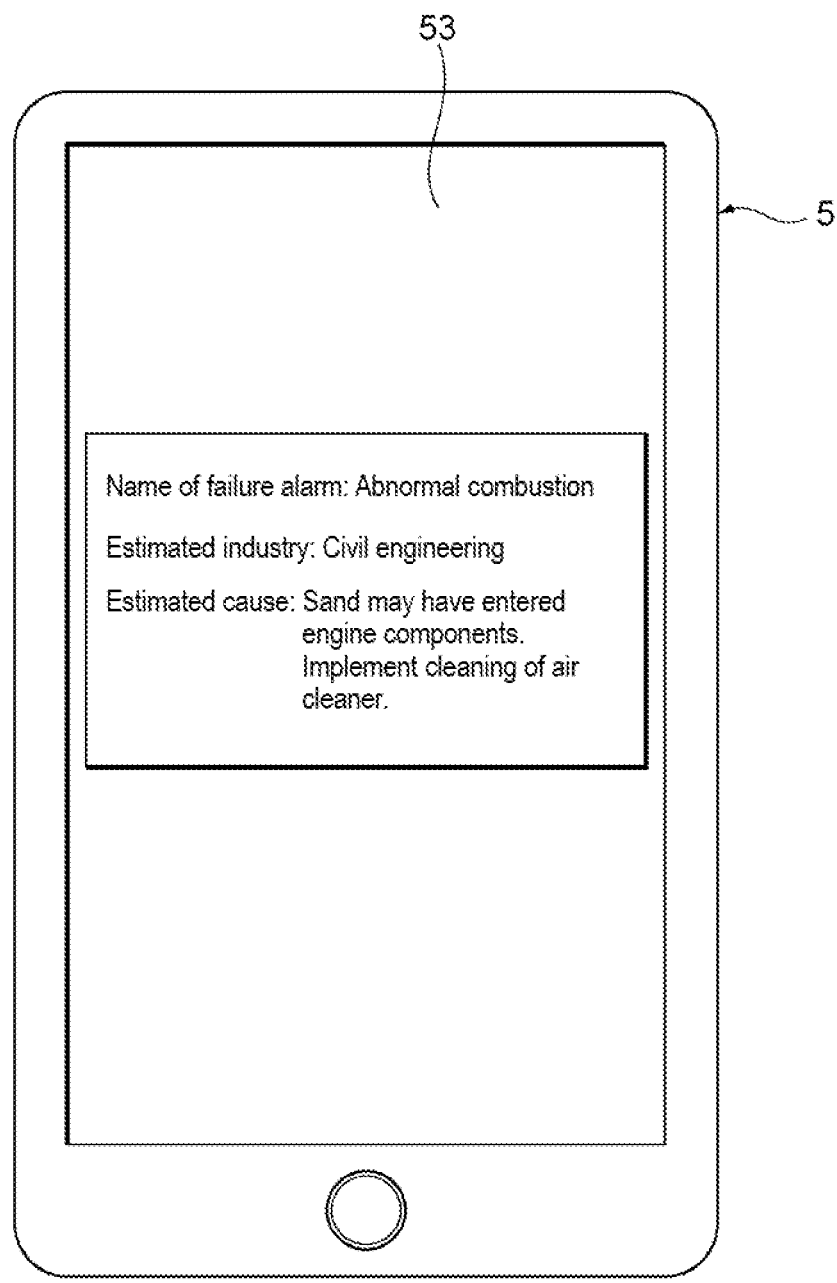
FIG. 9 illustrates an example of a failure cause displayed on the user terminal.
Figure 10:
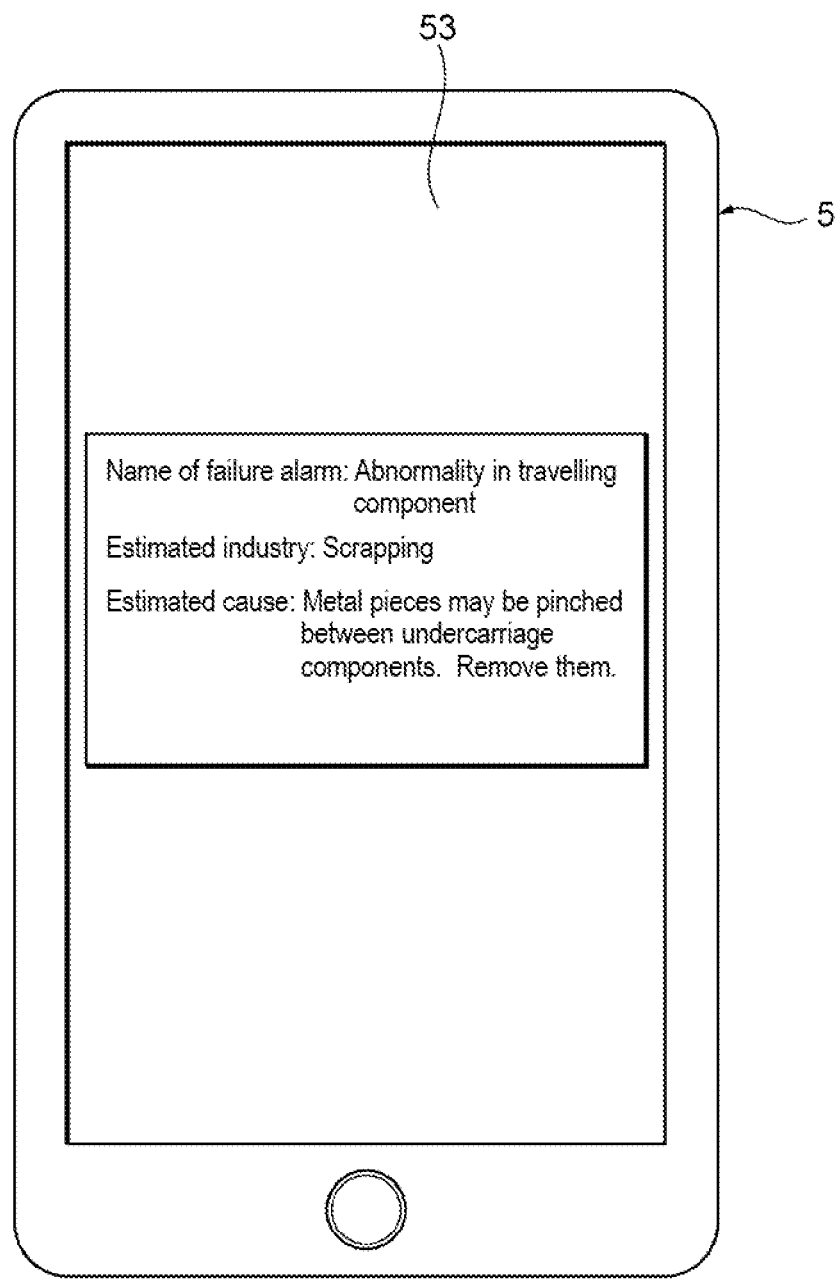
FIG. 10 illustrates an example of a failure cause displayed on the user terminal.

Then, if the addressed attached to the received mail is clicked on the user terminal 5, contents concerning "Failure alarm name", "Estimated industry", and "Estimated cause" are displayed on the display section 53, as illustrated in FIG. 9 and FIG. 10. For example, in the example illustrated in FIG. 9, the industry is estimated to be civil engineering, and the cause of the abnormal combustion failure is estimated to be possible entry of sand into an engine component. In the example illustrated in FIG. 10, the industry is estimated to be scrapping, and the cause of the travelling component failure is estimated to be possible pinching of metal pieces between undercarriage components. Thus, the owner or the like of the work machine 2, seeing the displayed contents, can easily know the failure cause and take measures and the like with respect to the failure. In this way, it is also possible to improve the work efficiency of the maintenance worker for the work machine 2. As in FIG. 7, the display of the failure cause is not limited to text display. That is, the failure contents corresponding to the failure alarm may be displayed by showing a diagrammatic figure representing the silhouette of the work machine, and blinking the relevant portion. In this case, as in the example of FIG. 7, the blinking portion may be tapped to display additional information such as the estimated industry, wherein the probability may be indicated in percentage. If the probability of the estimated industry is close between at least two industries (for example, civil engineering (45%), industrial waste disposal (40%)), the industry with a highest probability and the industry with a next highest probability are shown together. The range of closeness may be set as desired. Such notation allows the maintenance worker for the work machine 2 to intuitively know information about the failure, and to make flexible preparations assuming the next-likely industry when identification of the estimated industry with the highest probability is difficult.

[Maintenance Assistance System]

In the following, a maintenance assistance system 100 is described with reference to FIG. 11. The maintenance assistance system 100 differs from the component life prediction system 1 described above in the structure of a server device 10A. The other structures are similar to the component life prediction system 1 and are therefore given similar signs to those of the component life prediction system 1, and duplicate descriptions are omitted.

Figure 11:
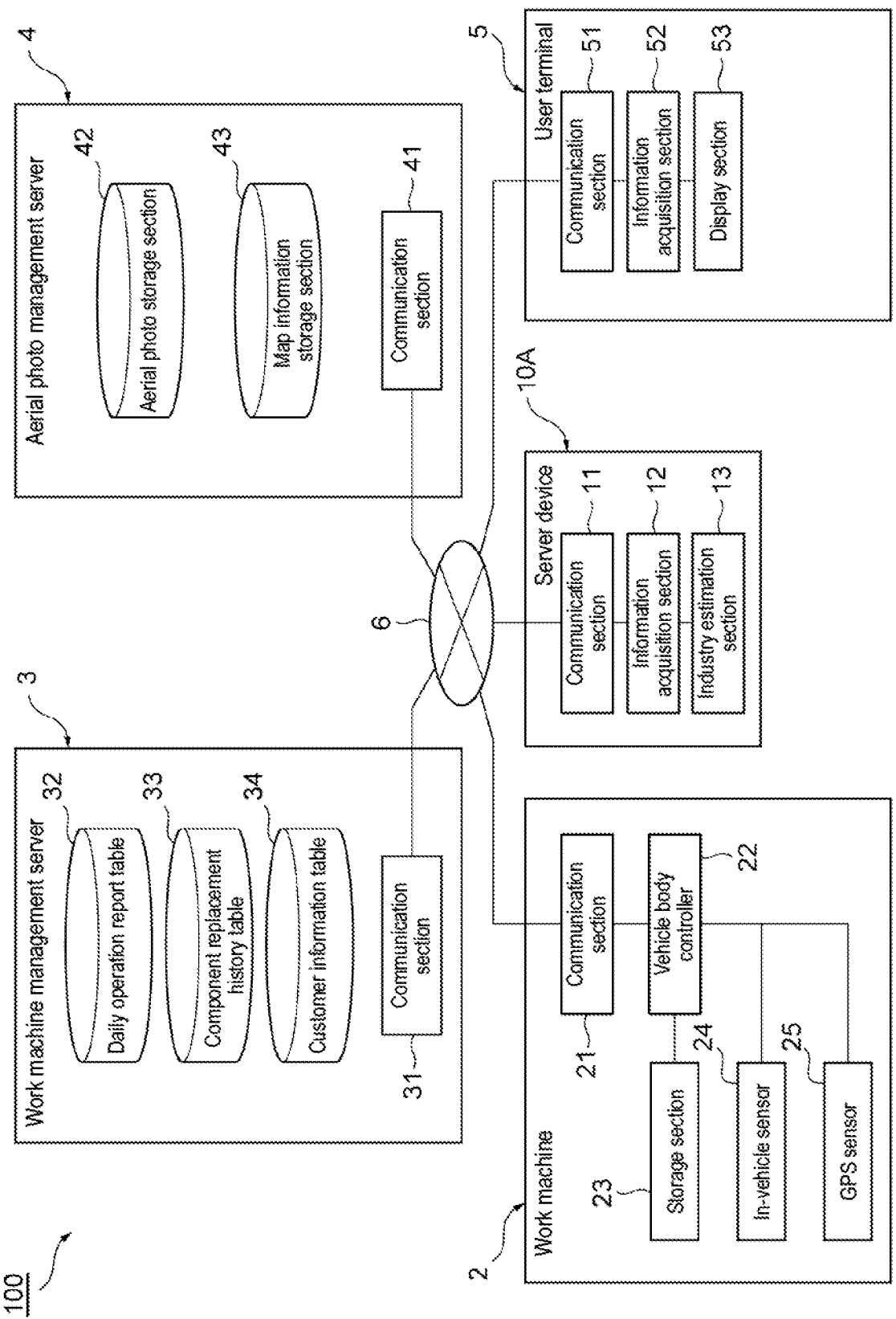
FIG. 11 is a schematic configuration diagram of a maintenance assistance system according to an embodiment.

As illustrated in FIG. 11, the maintenance assistance system 100 is a system for assisting maintenance work of a maintenance worker or the like. The maintenance assistance system 100 includes a work machine management server 3 that collects operation information of the work machine 2 including operation location information, an aerial photo management server 4 that stores an aerial photo based on position information, and the server device 10A. The server device 10A is configured to be able to communicate with each of the work machine management server 3 and the aerial photo management server 4. As in the component life prediction system 1 described above, the work machine management server 3 transmits the collected operation information of the work machine 2 to the server device 10A. The server device 10A transmits the operation information of the work machine 2 to the aerial photo management server 4. The aerial photo management server 4 extracts an aerial photo corresponding to the operation location information included in the operation information of the work machine 2, and transmits the aerial photo to the server device 10A.

The server device 10A also estimates the industry in which the work machine 2 is used based on the operation information of the work machine 2 and the aerial photo of the operation location of the work machine 2. Further, the server device 10A estimates the industry in which the work machine 2 is used based on the operation information of the work machine 2 and the operational feature of the work machine 2 in each industry.

Compared to the server device 10 of the component life prediction system 1 described above, the server device 10A does not include a component life prediction section 14 and a failure cause estimation section 15, and is only composed of a communication section 11, an information acquisition section 12, and an industry estimation section 13. The server device 10A transmits the result of industry estimation by the industry estimation section 13 to a terminal of the maintenance worker (namely, user terminal 5). Preferably, the server device 10A transmits prediction accuracy as well as the result of industry estimation. The maintenance worker, seeing the transmitted results, can know the industry in which the work machine 2 is used, and, moreover, can carry maintenance tools suitable for the industry to the site. This can prevent an increase in the burden on the maintenance worker due to carrying unnecessary tools, and improve the efficiency of the maintenance work.

According to the maintenance assistance system 100 of the present embodiment, as with the component life prediction system 1 described above, it is possible to increase the prediction accuracy of prediction of the life of a component of the work machine 2. Thus, the efficiency of the maintenance work can be improved.

While the embodiments of the present invention are described above, the present invention is not limited to the foregoing embodiments, and various design modifications may be made without departing from the spirit of the present invention set forth in the following claims.

REFERENCE SIGNS LIST

1 Component life prediction system
2 Work machine
3 Work machine management server
4 Aerial photo management server
5 User terminal
10, 10A Server device
11 Communication section
12 Information acquisition section
13 Industry estimation section
14 Component life prediction section
15 Failure cause estimation section
24 In-vehicle sensor
25 GPS sensor
32 Daily operation report table
33 Component replacement history table
42 Aerial photo storage section
53 Display section
100 Maintenance assistance system

The invention claimed is:

1. A component life prediction system comprising a work machine; a work machine management server that collects operation information including an operation location of the work machine; an aerial photo management server that stores aerial photos taken at various areas of the world together with latitude and longitude information; a server device that predicts a life of a component of the work machine; and a user terminal that acquires information from the server device, wherein the work machine management server, the aerial photo management server, the server device, and the user terminal are configured to be able to communicate with and are connected, via a network, to the work machine, and wherein the server device includes a processing unit that performs steps including: acquiring, from the work machine management server, the operation information of the work machine including information on the operation location of the work machine; acquiring, from the aerial photo management server, an aerial photo at the operation location based on the information on the operation location included in acquired operation information; building an industry estimation model by identifying an industry in which the work machine is used in the past to perform deep learning with respect to teacher data for machine learning created by associating the identified industry with the aerial photo at an operation location of a past use; estimating the industry in which the work machine is used, based on the operation information of the work machine and an operational feature of the work machine in each industry created in advance, and increasing accuracy of the industry estimation model based on an estimation result of the industry based on the operation information and the operational feature of the work machine and an estimation result of the industry based on the machine learning using the aerial photo; acquiring, from the aerial photo management server, the aerial photo at the operation location based on the information on the operation location of the work machine when estimating the industry in which a predetermined work machine is used to estimate the industry in which the work machine is used based on an acquired aerial photo and the industry estimation model; extracting a model component as an index for life prediction for each industry based on the industry, which is estimated so as to predict a life of the model component of the work machine, based on a pre-created relationship between an operation time and a wear rate of the model component for each industry; calculating a replacement time of the model component based on the predicted life of the model component; and notifying the user terminal of an alarm if it is determined that the replacement time of the model component is greater than or equal to a threshold value.

2. The component life prediction system according to claim 1, wherein the server device further estimates a cause of failure of a component, based on the industry.

3. The component life prediction system according to claim 2, wherein the server device transmits a result of component life prediction and a result of failure cause estimation to the user terminal.

\* \* \* \* \*